United States Patent
Memminger et al.

(10) Patent No.: US 9,225,224 B2
(45) Date of Patent: Dec. 29, 2015

(54) DYNAMOELECTRIC MACHINE HAVING AIR/LIQUID COOLING

(75) Inventors: Oliver Memminger, Neuburg a.Inn (DE); Friedrich Schöberl, Ruhstorf a.d. Rott (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 209 days.

(21) Appl. No.: 13/703,282
(22) PCT Filed: May 6, 2011
(86) PCT No.: PCT/EP2011/057264
§ 371 (c)(1), (2), (4) Date: Dec. 10, 2012
(87) PCT Pub. No.: WO2011/154205
PCT Pub. Date: Dec. 15, 2011

(65) Prior Publication Data

US 2013/0076168 A1 Mar. 28, 2013

(30) Foreign Application Priority Data

Jun. 11, 2010 (DE) .......................... 10 2010 029 986

(51) Int. Cl.
*H02K 9/00* (2006.01)
*H02K 9/12* (2006.01)
(Continued)

(52) U.S. Cl.
CPC .. *H02K 9/00* (2013.01); *H02K 5/20* (2013.01); *H02K 9/04* (2013.01); *H02K 9/10* (2013.01);
(Continued)

(58) Field of Classification Search
CPC .............. H02K 9/00; H02K 9/19; H02K 5/20
USPC ....................................................... 310/52–64
See application file for complete search history.

(56) References Cited

U.S. PATENT DOCUMENTS 3,439,202 A * 4/1969 Wanke ............................ 310/52
4,360,749 A * 11/1982 Neumann et al. ............... 360/42
(Continued)

FOREIGN PATENT DOCUMENTS

CN 1784818 A 6/2006
CN 101162859 A 4/2008
(Continued)

OTHER PUBLICATIONS

Dietrich, Manfred; Heidl, Roland; Geelink, Andreas, Cooling device for high-speed motor, AUDI AG, Mar. 12, 1998; DE 19635196.*

*Primary Examiner* — Terrance Kenerly
*Assistant Examiner* — Alexander Singh
(74) *Attorney, Agent, or Firm* — Henry M. Feiereisen LLC

(57) ABSTRACT

A dynamoelectric machine includes a stator having a laminated core and a winding system, which forms winding heads on end faces of the stator, and a rotor having a laminated core and connected to a shaft in a rotationally fixed manner. The stator and the rotor are arranged in a housing, and the shaft is supported by bearings arranged in bearing shields. The laminated core of the stator and/or rotor has axially extending cooling channels. The bearing shields form with the housing a closed interior having at least one closed inner cooling circuit. The housing has an outer jacket and an inner jacket facing the stator and arranged at a distance from the outer jacket in some sections. The outer jacket and the inner jacket combined form a cooling jacket defined by an axial extension which equals at least the axial extension of the laminated core of the stator.

8 Claims, 3 Drawing Sheets

(51) Int. Cl.
*H02K 9/04* (2006.01)
*H02K 5/18* (2006.01)
*H02K 5/20* (2006.01)
*H02K 9/19* (2006.01)
*H02K 9/10* (2006.01)
*H02K 7/18* (2006.01)

(52) U.S. Cl.
CPC .. *H02K 9/12* (2013.01); *H02K 9/19* (2013.01); *H02K 5/18* (2013.01); *H02K 7/1838* (2013.01); *Y02E 10/725* (2013.01)

(56) References Cited

U.S. PATENT DOCUMENTS

| | | | | |
|---|---|---|---|---|
| 4,365,178 | A * | 12/1982 | Lenz | 310/61 |
| 4,409,502 | A * | 10/1983 | McCabria | 310/61 |
| 5,448,118 | A * | 9/1995 | Nakamura et al. | 310/54 |
| 5,703,421 | A * | 12/1997 | Durkin | 310/61 |
| 6,392,320 | B1 * | 5/2002 | Glahn et al. | 310/52 |
| 7,466,053 | B1 | 12/2008 | Radev | |
| 2002/0047473 | A1* | 4/2002 | Laurent et al. | 310/254 |
| 2004/0150270 | A1 | 8/2004 | Kitamura | |
| 2007/0024129 | A1* | 2/2007 | Pfannschmidt et al. | 310/59 |
| 2008/0252169 | A1* | 10/2008 | Fujita et al. | 310/213 |
| 2009/0058205 | A1* | 3/2009 | Tounosu et al. | 310/61 |
| 2009/0267426 | A1* | 10/2009 | Graner et al. | 310/54 |
| 2009/0267428 | A1* | 10/2009 | Nakahara et al. | 310/59 |
| 2011/0068644 | A1* | 3/2011 | Kamp | 310/53 |

FOREIGN PATENT DOCUMENTS

| | | |
|---|---|---|
| CN | 101557143 A | 10/2009 |
| DE | 39 25 337 A1 | 2/1991 |
| DE | 42 29 395 A1 | 3/1994 |
| DE | 195 26 689 A1 | 1/1997 |
| DE | 196 35 196 A1 | 3/1998 |
| DE | 19635196 A1 * | 3/1998 |
| DE | 299 13 314 U1 | 10/1999 |
| DE | 102 53 699 A1 | 5/2004 |
| DE | 10 2008 045 667 A1 | 3/2010 |
| EP | 0 046 315 A1 | 2/1982 |
| EP | 1 515 417 A2 | 3/2005 |
| FR | 1 000 631 A | 2/1952 |
| RU | 2340066 C1 | 11/2008 |
| WO | WO 2008/059687 A1 | 5/2008 |

* cited by examiner

DYNAMOELECTRIC MACHINE HAVING AIR/LIQUID COOLING

CROSS-REFERENCES TO RELATED APPLICATIONS

This application is the U.S. National Stage of International Application No. PCT/EP2011/057264, filed May 6, 2011, which designated the United States and has been published as International Publication No. WO 2011/154205 and which claims the priority of German Patent Application, Serial No. 10 2010 029 986.3, filed Jun. 11, 2010, pursuant to 35 U.S.C. 119(a)-(d).

BACKGROUND OF THE INVENTION

The invention relates to a dynamoelectric machine comprising a stator and a rotor with a closed cooling circuit.

The cooling media used for cooling dynamoelectric machines are gases, in particular air and liquids. Combinations of these cooling principles are also provided in dynamoelectric machines in order to achieve efficient cooling An electric machine is known from DE 299 13 314 U1 having a housing, with a stator and a rotor and water cooling, wherein the laminated core of the stator is shrunk into a housing and lies on the whole core length in the housing. A cooling spiral is provided between the inner jacket and outer jacket, wherein the air jacket provided radially outside represents a closed system.

The drawback of this that internal fans guide the internal circulating air flow onto the air jacket, which guides the internal air flow over cooling fins. The air jacket is then just as hot as the air emerging from the rotor. These hot regions present a large problem for maintenance staff in particular in confined spaces, e.g. in the gondolas of wind-power generators.

In addition, the heat emitted also heats the environment of the dynamoelectric machine. The cooling efficiency is also limited by a design of this kind since the part of the stator around which cooling water flows only accounts for a fraction of the overall length of the housing.

SUMMARY OF THE INVENTION

Consequently, the invention is based on the object of providing a dynamoelectric machine which, on the one hand, provides sufficient cooling, in particular for confined spaces and at the same time does not pose any risk to maintenance staff in confined spaces, such as those found in wind-power gondolas.

The object is achieved by a dynamoelectric machine, in particular a wind generator comprising a stator which is designed as a laminated core and has a winding system, which forms winding heads on the end faces of the stator and a rotor, which is designed as a laminated core and which is connected to a shaft in a rotationally fixed manner,
wherein the stator and rotor are arranged in a housing,
wherein the shaft is supported by means of bearings, which are arranged in bearing shields,
wherein the laminated core of the stator and rotor has axially extending cooling channels,
wherein the bearing shields form a closed interior together with the housing, said interior having at least one closed inner cooling circuit,
wherein the housing has an outer jacket and an inner jacket facing the stator and arranged at a distance from the outer jacket in some sections,
wherein the outer jacket and the inner jacket combined form a cooling jacket, in particular a liquid cooling jacket, the axial extension of which equals at least the axial extension of the laminated core of the stator.

The arrangement according to the invention means the temperature of the housing is now uncritical for maintenance staff, since the cooling jacket now only has the maximum permissible cooling temperature.

In order further to increase the cooling efficiency of the cooling jacket, the inner jacket comprises cooling fins extending axially toward the outer circumference of the stator and hence enlarging the heat-transfer surface of the cooling jacket. These fins and hence the inner jacket are supported on the outer circumference of the stator only at predetermined support points, but which do not reduce the cooling capacity. These cooling fins are welded or cast on the inner side of the inner jacket.

In order further to increase the cooling efficiency, the entire length of the housing of the stator is used to recool the internal air. In addition, it is now possible for cooling water to flow round the entire outside surface of the inner jacket thus substantially increasing the cooling efficiency. On the outside surface of the inner jacket, liquid circulates between inner jacket and outer jacket in the cooling jacket which is now formed. The cooling channels of the cooling jacket extend in either a spiral shaped or a meandering shape around the interior of the dynamoelectric machine. In order to obtain a cooling jacket that is an impervious as possible, the outer jacket and inner jacket are joined together in a thermal or hydraulic shrinking process.

The principal structure now shows that the liquid cooling takes place radially externally while the cooling fins for recooling the circulating internal air are arranged between yoke rears of the stator and the liquid cooling jacket.

For this reason, the surface temperature of the dynamoelectric machine during operation is now never higher than the maximum permissible cooling water temperature of the dynamoelectric machine. This also prevents heating-up of the environment and other devices, in particular in a confined wind-power gondola. Hence, hot surfaces on the dynamoelectric machine are also avoided and the maintenance staff are exposed to less risk.

Advantageously, a pressure finger arrangement, that is special intermediate elements, creates radial cooling channels between the partial laminated cores of the stator and rotor. Ideally, these cooling channels of the rotor and stator are aligned in a radial direction, so that the air flow from an axially extending cooling channel of the rotor and entry in the radial cooling channel pass of the electromagnetic air gap enters a radial cooling duct of the stator and emerges again on the outer circumference of the laminated core of the stator and bounces on the cooling jacket where it is recooled.

Ideally, this circulation of the internal air is provided by natural convection, that is without a fan, although to achieve additional air circulation, at least one fan is provided on a shaft.

Advantageously, air conduction elements are arranged inside the inner cooling circuit so that sufficient cooling of the winding head and the bearing shield takes place. This means that not only the cylindrical outside surface of the dynamoelectric machine is uncritical for maintenance staff, but also the bearing shields on the end faces of the dynamoelectric machine are thermally uncritical. This results in simultaneous cooling of the bearings, thus reducing the risk of grease decomposition due to excessive temperature.

BRIEF DESCRIPTION OF THE DRAWING

The invention and further advantageous embodiments of the invention will be explained in more detail with reference to a schematic representation of an exemplary embodiment, which shows.

DETAILED DESCRIPTION OF PREFERRED EMBODIMENTS

Figure 1:
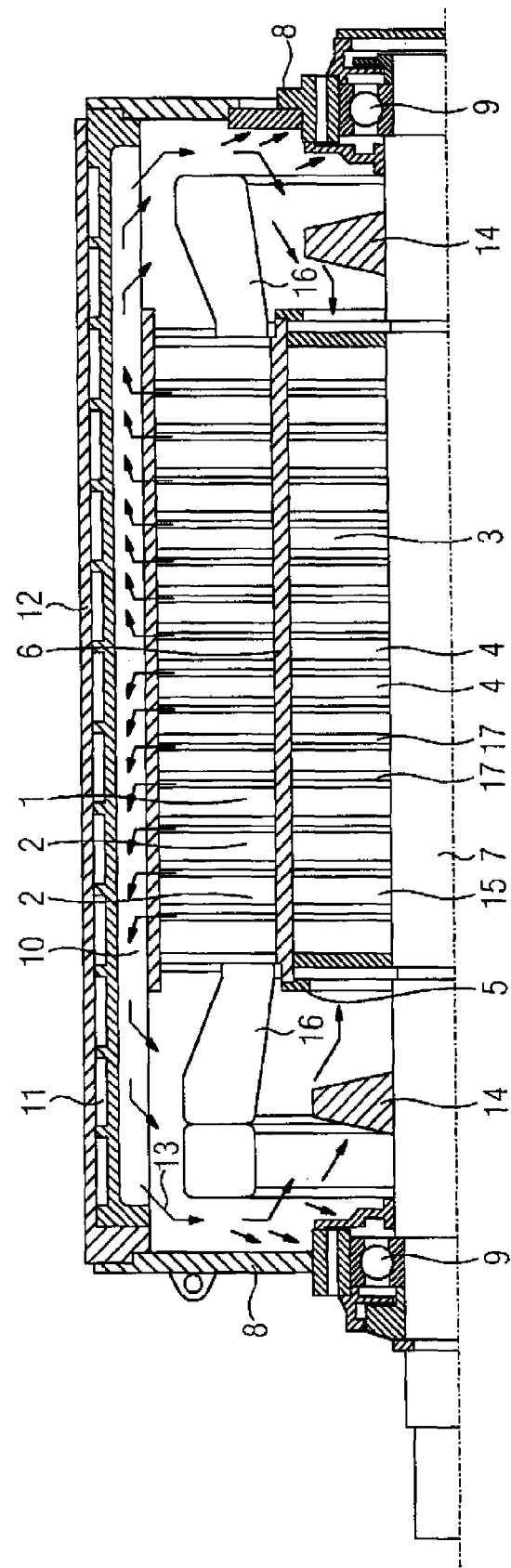
FIG. 1 a partial longitudinal section of a dynamoelectric machine.

FIG. 1 is a partial longitudinal section of a dynamoelectric machine such as those used in particular for wind-power generators.

A stator 1, with a laminated core made up of partial laminated cores 2 comprises a winding system (not shown in any more detail) arranged in grooves so that winding heads 16 are formed on the end faces of the laminated core of the stator 1. A rotor 3 spaced apart by a air gap (not shown in more detail) from the stator 1 is arranged in a radial direction and positioned on a shaft 7 in a rotationally fixed manner, in particular shrunk-onto the shaft or connected to it by means of keyway connections. The shaft 7 is supported by bearings 9, which are arranged in bearing shields 8.

In the present example, the rotor 3 is designed as a short-circuit rotor and, for this reason, comprises short-circuit rods 6, which are connected to each other in an electrically conductive way on the end faces of the rotor 3 by means of short-circuit rings 5.

The rotor 3 also comprises a laminated core, which is divided into partial laminated cores 4. The partial laminated cores 2 of the stator 1 and the partial laminated cores 4 of the rotor 3 are axially spaced apart by intermediate elements 17 and to be precise such that radial cooling ducts are formed between the partial laminated cores 2 and 4.

Advantageously, these radial cooling ducts of the stator 1 and rotor 3 are arranged in radial alignment, as shown in FIG. 1. This causes a cooling air flow 13 driven in an axial direction by natural convection or by a fan 14 to enter axially extending cooling channels 15 of the rotor 3 and/or stator 1. After each partial laminated core, a part of the axially entering air flow is deflected radially. The air volume deflected in this way is selected by suitable dimensioning of intermediate elements 17 and diameters of the axial cooling channels 15 such that a uniform temperature distribution is established over the axial length of the rotor 3 and/or stator 1 during the operation of the dynamoelectric machine.

The already heated air volumes emerging from the rotor 3 in a radial direction pass over the air gap of the dynamoelectric machine into the radial cooling ducts of the stator 1 which face each other. There, the air is further heated and exits the stator 1 in a radial direction. If the stator 1 comprises axially extending cooling channels, a mixture of air volumes also enters the radial cooling ducts of the stator 1.

The cooling fins 10 of the inner jacket 19 result in recooling of the radially emerging air volumes.

The further the inner jacket 19 extends in an axial direction and hence forms the cooling jacket 11 together with the outer jacket 12, the better the recooling of the internal air flows.

The axial extension of the cooling jacket 11 should at least equal the axial extension of the stator 1. The extension of the cooling jacket from one winding head to the other or even over the entire axial length of the dynamoelectric machine, i.e. from one bearing shield 8 to the other, is substantially more suitable.

This also reduces the risk of combustion on the housing.

Since on entry in the laminated core of the rotor 3 and/or stator 1, the recooled cooling air absorbs heat once again and hence the cooling efficiency is reduced toward the center of the laminated cores, advantageously the spacings between the intermediate elements 17 are reduced toward the center. This increases the cooling efficiency of the entire dynamoelectric machine.

Advantageously, the dynamoelectric machine has a double-flow design, i.e. cooling of the air flow takes place on both the left-hand and right-hand side, so that means for separating the air flow are provided axially to the center of the stator 1 and rotor 3. This results in a further increase in the cooling efficiency of the dynamoelectric machine.

Figure 2:
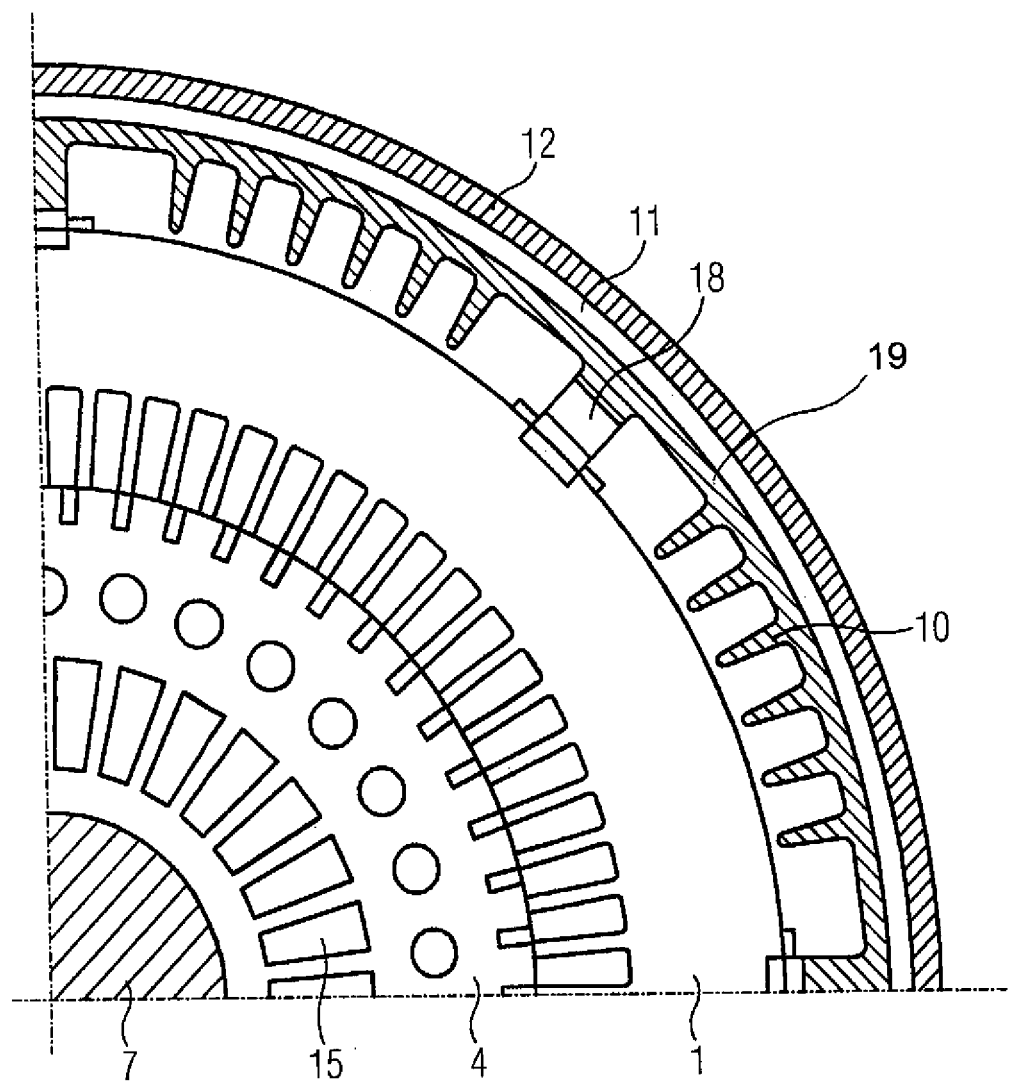
FIG. 2 a partial cross section of a dynamoelectric machine.
Figure 3:
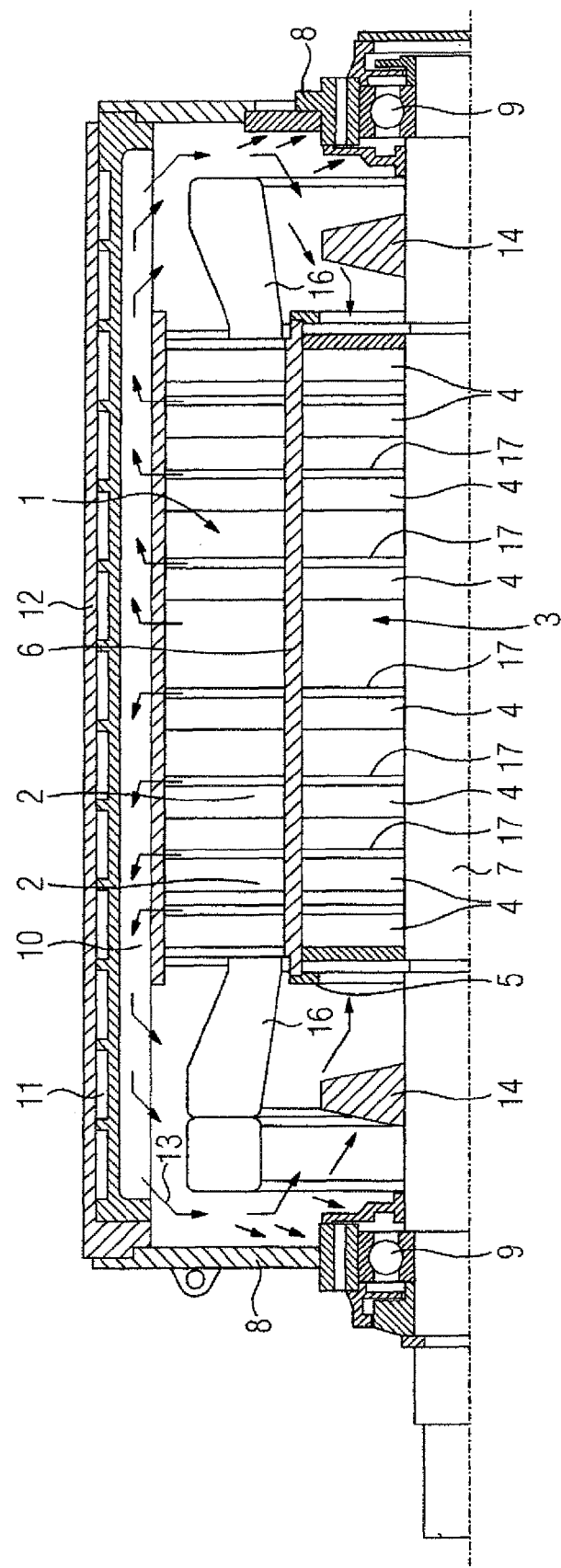
FIG. 3 is an enlarged view showing an axial distance of the partial laminated cores to the center of the laminated core of a rotor and a stator of a dynamoelectric machine.

FIG. 2 is a partial cross section of the structure of the dynamoelectric machine, wherein the rotor 3 with its partial laminated cores 4 is positioned on the shaft 7. Each partial laminated core comprises cooling channels 15, which are advantageously in axial alignment. The laminated core of the stator 1, which comprises grooves in which a winding system is located, is connected radially outward to the rotor 3.

At the outer circumference of the laminated core of the stator 1, that is on yoke rear, there are support points 18 of the inner jacket 19 comprising radially inward facing, substantially axially extending cooling fins 10. The support points 18, embodied in the form of clips for example, are distributed on the circumference of the yoke rear, for example three support points 18 are arranged each offset by 120 degrees. In the axial direction of the stator 1, further support points 18 are provided with a predetermined axial spacing. Alternatively, the support points 18 are embodied as axially extending straps advantageously comprising openings. The openings in a strap are either on the radially inner side and/or radially outer side resulting in either a comb-like design or an alternation of the openings on the inner and outer sides.

Like the almost point-focal support points 18, the openings ensure air flow with a component in the circumferential direction. This ensures uniform cooling of the dynamoelectric machine in the axial direction and the circumferential direction.

In this case, the cooling fins 10 do not lie on the yoke rear.

The cooling jacket mantel 11 formed by the inner jacket 19 and outer jacket 12 cools air emerging from the laminated core of the stator 1. The cooling effect is intensified by the cooling fins 10 present on the inner jacket 19 due to the surface-enlarging structure of the inner jacket 19.

The air flowing out of the stator 1 is cooled by the cooling jacket 11 by sweeping against the cooling fins 10 of the inner jacket 19 in the direction of the bearing shields 8. This cooled air flows on or through the winding head 16 and/or the inner side of the bearing shield 8 back into the axial cooling channels of the rotor 3 and/or stator 1.

The invention claimed is:

1. A wind generator, comprising:
   a housing having an outer jacket and an inner jacket which together form a cooling jacket defined by an axial extension, said inner jacket facing the stator and having at least one section arranged at a distance from the outer jacket;
   a shaft;
   a bearing assembly supporting the shaft, said bearing assembly having bearing shields and bearings arranged in the bearing shields, said bearing shields disposed in spaced relationship to define an axial distance which equals the axial extension of the cooling jacket, said bearing shields forming together with the housing a closed interior having at least one closed inner cooling circuit;

a stator arranged in the housing and having a laminated core and a winding system, said winding system having winding heads arranged on end faces of the stator, said laminated core of the stator having radial cooling ducts and an outer circumference to define a yoke rear for support of support points of the inner jacket, with the inner jacket comprising radially inwardly-facing substantially axially extending cooling fins sized shy of the yoke rear, the inner jacket of the housing being radially spaced from the yoke rear of the stator, and the radial cooling ducts of the stator are radially outwardly open into an uninterrupted space between the stator and the inner jacket of the cooling jacket; and a rotor arranged in the housing and having a laminated core, said rotor being connected in fixed rotative engagement with the shaft and having radial cooling ducts arranged so that at least some of the radial cooling ducts of the rotor are aligned with the radial cooling ducts of the stator radially, so that air flows radially outwardly through the radial cooling ducts of the rotor, then radially outwardly through the aligned radial cooling ducts of the stator, then exit into the space between the stator and the inner jacket of the cooling jacket, and then flows through the uninterrupted space between the stator and the inner jacket of the cooling jacket in an axial direction to the winding heads and is cooled on its way in the axial direction to the winding heads;

wherein the laminated core of at least one member selected from the group consisting of the stator and the rotor has axial cooling channels.

2. The wind generator of claim 1, wherein the cooling jacket is constructed for circulation of a liquid coolant.

3. The wind generator of claim 1, wherein at least one of the outer jacket and the inner jacket is constructed so as to provide a meandering or spiral course of resultant cooling channels in the cooling jacket, when the outer jacket and the inner jacket are connected in axial direction.

4. The wind generator of claim 1, wherein the laminated core of the member includes partial laminated cores which are separated axially from each other by intermediate elements to define the radial cooling ducts.

5. The wind generator of claim 4, wherein axially adjacent ones of the partial laminated cores are arranged at an axial spacing which increases toward a center of the laminated core.

6. The wind generator of claim 4, wherein the partial laminated cores are arranged axially behind one another at a spacing which decreases toward a center of the laminated core.

7. The wind generator of claim 1, wherein each of the laminated core of the stator and the laminated core of the rotor is constructed with a separation to provide a double-flow configuration of the inner cooling circuit.

8. The wind generator of claim 1, further comprising at least one of fans or air conduction elements arranged in the interior to guide an air flow over the winding heads of the winding system or bearing shields prior to entering the axial cooling channels of the member.

* * * * *